United States Patent
Lundborg (10) Patent No.: US 10,382,971 B2
(45) Date of Patent: Aug. 13, 2019

(54) METHODS AND DEVICES FOR REQUESTING AND ASSIGNING RESOURCES IN AN UNLICENSED SPECTRUM

(71) Applicant: Telefonaktiebolaget LM Ericsson (publ), Stockholm (SE)

(72) Inventor: Tomas Lundborg, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/753,732

(22) PCT Filed: Sep. 14, 2015

(86) PCT No.: PCT/SE2015/050958
§ 371 (c)(1),
(2) Date: Feb. 20, 2018

(87) PCT Pub. No.: WO2017/048160
PCT Pub. Date: Mar. 23, 2017

(65) Prior Publication Data
US 2018/0242159 A1 Aug. 23, 2018

(51) Int. Cl.
*H04W 72/00* (2009.01)
*H04W 16/06* (2009.01)
(Continued)

(52) U.S. Cl.
CPC ........... *H04W 16/06* (2013.01); *H04W 16/14* (2013.01); *H04L 5/001* (2013.01); *H04W 72/0426* (2013.01)

(58) Field of Classification Search
CPC ..... H04W 72/04; H04W 76/02; H04W 16/10; H04W 28/16; H04W 16/14; H04W 16/12;
(Continued)

(56) References Cited

U.S. PATENT DOCUMENTS

2009/0275332 A1* 11/2009 Niska ............... H04W 36/0077
455/436
2012/0129523 A1* 5/2012 Jung .................... H04W 48/02
455/434
(Continued)

FOREIGN PATENT DOCUMENTS

WO 2015081984 A1 6/2015
WO 2015090396 A1 6/2015
WO 2015113226 A1 8/2015

OTHER PUBLICATIONS

ETSI 3rd Generation Partnership Project, "LTE; Evolved Universal Terrestrial Radio Access Network (E-UTRAN); X2 Application Protocol (X2AP) (3GPP TS 36.423 version 12.6.0 Release 12)," ETSI TS 136 423 v12.6.0, Technical Specification, Jul. 1, 2015, Sophia Antipolis, France, pp. 1-208.

*Primary Examiner* — Dai Phuong
(74) *Attorney, Agent, or Firm* — Coats & Bennett, PLLC (57) ABSTRACT

A method performed by a first base station of requesting resources in an unlicensed spectrum for a mobile terminal for which the first base station serves as a primary cell base station is provided. The method comprises submitting a request for the unlicensed spectrum resources to a second base station serving as a secondary cell base station for the mobile terminal, receiving a response to the request from the second base station indicating that unlicensed spectrum resources will be assigned. The method further comprises submitting, in case the assigned unlicensed spectrum resources are not sufficient for serving the mobile terminal, a request to the second base station to give priority to assignment of the requested unlicensed spectrum resources over resources requested by mobile terminals for which said second base station serves as a primary cell base station.

8 Claims, 4 Drawing Sheets

(51) Int. Cl.
*H04W 16/14* (2009.01)
*H04L 5/00* (2006.01)
*H04W 72/04* (2009.01)

(58) Field of Classification Search
CPC ... H04W 28/04; H04W 74/02; H04W 84/042;
H04W 28/08; H04W 24/00; H04W 16/06
USPC .................. 455/436–439, 442–453, 454;
370/329–334
See application file for complete search history.

(56) References Cited

U.S. PATENT DOCUMENTS

| | | | |
|---|---|---|---|
| 2013/0064220 A1* | 3/2013 | Yin ................. | H04W 36/00835 370/331 |
| 2013/0077599 A1* | 3/2013 | Dimou ................. | H04W 36/22 370/331 |
| 2013/0143578 A1* | 6/2013 | Lekutai ........... | H04W 36/00837 455/444 |
| 2013/0225167 A1* | 8/2013 | Tokgoz ................. | H04W 16/14 455/435.1 |
| 2013/0225181 A1* | 8/2013 | Radulescu ............ | H04W 36/22 455/442 |
| 2014/0162661 A1* | 6/2014 | Shaw ................... | H04W 36/22 455/439 |
| 2014/0302867 A1* | 10/2014 | Mizusawa ............. | H04W 16/16 455/452.1 |
| 2015/0071224 A1* | 3/2015 | Baker ............... | H04W 72/1221 370/329 |
| 2016/0182286 A1* | 6/2016 | Lunden ................ | H04W 24/02 370/254 |

* cited by examiner

METHODS AND DEVICES FOR REQUESTING AND ASSIGNING RESOURCES IN AN UNLICENSED SPECTRUM

TECHNICAL FIELD

The invention relates to methods and devices of requesting and assigning resources in an unlicensed spectrum. The invention further relates to computer programs for causing the devices to perform the methods according to the invention, and corresponding computer program products.

BACKGROUND

Recently, License Assisted Access (LAA) has been proposed as a solution for offloading a licensed spectrum, such as e.g. Long-Term Evolution (LTE) by using an unlicensed, "free" spectrum, for instance LTE in unlicensed spectrum (LTE-U), or the 2.4 GHz or 5 GHz band used by Wi-Fi equipment.

With LAA, initial access is made on a licensed spectrum (e.g. LTE) primary carrier, but the traffic load is then shared on an unlicensed spectrum (e.g. LTE-U or Wi-Fi) secondary carrier, using known methods such as Carrier Aggregation (CA) or Dual Connectivity (DC). Hence, the unlicensed spectrum is used for transferring bulk payload data of a mobile terminal on the secondary carrier, while control of the mobile terminal still is maintained in the licensed spectrum via the primary carrier.

When LAA is used to serve e.g. indoor traffic (or an outdoor hotspot) provisioned by for instance a picocell, the licensed spectrum indoor cell might not cover the entire building—sections of the building may be covered by an outdoor macro cell. In fact, even if the unlicensed spectrum controlled by the indoor cell covers the entire building, there may still be sections in the building where the outdoor macro cell is stronger than the indoor cell and thus acts as a serving cell for some of the indoor mobile terminals This may cause problems, in that indoor mobile terminals may establish communication channels with an outdoor base station of the macro cell instead of connecting to an indoor base station. As discussed hereinabove, using LAA, an unlicensed spectrum carrier may be set up with the indoor base station. However, the current LAA approach may lead to poor utilization of system resources, in particular causing an unnecessary load on macro cells in the case where the macro cells are to be offloaded by smaller cells, such as indoor systems.

SUMMARY

An object of the present invention is to solve, or at least mitigate, this problem in the art and to provide an improved method of requesting and assigning resources in an unlicensed spectrum for mobile terminals.

This object is attained in a first aspect of the invention by a method performed by a first base station of requesting resources in an unlicensed spectrum for a mobile terminal for which the first base station serves as a primary cell base station, comprising submitting a request for the unlicensed spectrum resources to a second base station serving as a secondary cell base station for the mobile terminal, receiving a response to the request from the second base station indicating that unlicensed spectrum resources will be assigned. The method further comprises submitting, in case the assigned unlicensed spectrum resources are not sufficient for serving the mobile terminal, a request to the second base station to give priority to assignment of the requested unlicensed spectrum resources over resources requested by mobile terminals for which said second base station serves as a primary cell base station.

This object is attained in a second aspect of the invention by a base station configured to request resources in an unlicensed spectrum for a mobile terminal for which the base station serves as a primary cell base station, the base station comprising a processing unit and a memory, said memory containing instructions executable by said processing unit, whereby said base station is operative to submit a request for the unlicensed spectrum resources to another base station serving as a secondary cell base station for the mobile terminal, receive a response to the request from said another base station indicating that unlicensed spectrum resources will be assigned, and in case the assigned unlicensed spectrum resources are not sufficient for serving the mobile terminal, to submit a request to said another base station to give priority to assignment of the requested unlicensed spectrum resources over resources requested by mobile terminals for which said another base station serves as a primary cell base station.

This object is attained in a third aspect of the invention by a method performed by a first base station of requesting resources in an unlicensed spectrum for a mobile terminal for which the first base station serves as a primary cell base station, comprising submitting a request for the unlicensed spectrum resources to a second base station serving as a secondary cell base station for the mobile terminal, the request further comprising an indication to the second base station to prioritize the requested unlicensed spectrum resources.

This object is attained in a fourth aspect of the invention by a base station configured to request resources in an unlicensed spectrum for a mobile terminal for which the base station serves as primary cell base station, the base station comprising a processing unit and a memory, said memory containing instructions executable by said processing unit, whereby said base station is operative to submit a request for the unlicensed spectrum resources to another base station serving as a secondary cell base station for the mobile terminal, the request further comprising an indication to said another base station to prioritize the requested unlicensed spectrum resources.

This object is attained in a fifth aspect of the invention by a method performed by a second base station of assigning resources in an unlicensed spectrum for a mobile terminal for which the second base station serves as a secondary cell base station, comprising receiving a request for the unlicensed spectrum resources from a first base station serving as a primary cell base station for the mobile terminal, and prioritizing assignment of unlicensed spectrum resources to said mobile terminal over resources requested by mobile terminals for which said second base station serves as a primary cell base station.

This object is attained in a sixth aspect of the invention by a base station configured to assign resources in an unlicensed spectrum for a mobile terminal for which the base station serves as a secondary cell base station, the base station comprising a processing unit and a memory, said memory containing instructions executable by said processing unit, whereby said base station is operative to receive a request for the unlicensed spectrum resources from another base station serving as a primary cell base station for the mobile terminal, and prioritize assignment of unlicensed spectrum resources to said mobile terminal over resources requested by mobile terminals for which said base station serves as a primary cell base station.

In the first aspect, a first base station, e.g. an eNodeB, requests resources in the unlicensed spectrum for a mobile terminal for which the eNodeB serves as the primary cell base station. Thereafter, the eNodeB submits a request for unlicensed spectrum resources to a second base station, e.g. an indoor base station, serving as a secondary cell base station for the mobile terminal. Subsequently, the eNodeB receives from the indoor base station a response to the request indicating that unlicensed spectrum resources will be assigned by the indoor base station. In case the eNodeB for example considers the assigned unlicensed spectrum resources to be insufficient for serving the mobile terminal, the eNodeB will submit a request to the indoor base station to give priority to assignment of the requested unlicensed spectrum resources for the mobile terminal over resources requested by other mobile terminals for which the indoor base station serves as a primary cell base station. Advantageously, by prioritizing traffic on the secondary carrier of the eNodeB, system resources are better utilized.

In an embodiment, the eNodeB 14 receive a response from the indoor base station indicating that the requested unlicensed spectrum resources will be prioritized.

In the second aspect, the eNodeB makes a request for unlicensed spectrum resources for the mobile terminal to the indoor base station serving as a secondary cell base station for the mobile terminal. The request comprises an indication to the indoor base station to prioritize the requested unlicensed spectrum resources. The indoor base station will thus give priority to the resources assigned to the mobile terminal based on this request.

In an embodiment the eNodeB receives a response from the indoor base station indicating that the requested unlicensed spectrum resources will be prioritized. Again, by prioritizing traffic on the secondary carrier of the eNodeB, system resources are advantageously better utilized.

In the third aspect, the indoor base station receives a request for the unlicensed spectrum resources from the eNodeB serving as the primary cell base station for a mobile terminal for which the resources are requested. Upon receiving the request from the eNodeB, the indoor base station will prioritize assignment of unlicensed spectrum resources to the mobile terminal over resources requested by other mobile terminals for which the indoor base station serves as the primary cell base station.

In an embodiment, the indoor base station submits a response to the eNodeB indicating that the requested unlicensed spectrum resources will be prioritized for the mobile terminal. Again, by prioritizing traffic on the secondary carrier of the eNodeB, system resources are advantageously better utilized.

In an embodiment, the prioritizing of the assignment of unlicensed spectrum resources comprises actively reducing the unlicensed spectrum resources assigned to one or more of the mobile terminals for which the indoor base station serves as a primary cell base station.

In a further embodiment, the mobile terminal may perform a measurement to acquire information as to whether a base station providing access to the unlicensed spectrum is present.

The invention further relates to computer programs for causing the devices to perform the methods according to the invention, and corresponding computer program products.

Embodiments of the invention will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
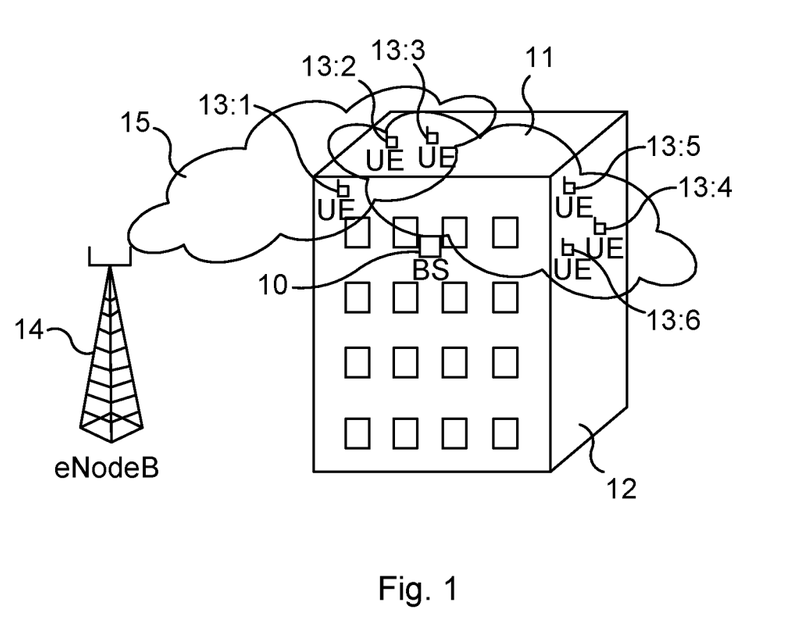
FIG. 1 illustrates a scenario where LAA typically may be implemented.

FIG. 1 illustrates a scenario where a base station (BS) 10 forms an indoor cell 11, thereby providing an indoor network to building 12. Now, one or more mobile terminals 13:1, 13:2, 13:3, in particular mobile terminals close to the confinements of the building, may establish communication channels with a an outdoor base station 14 forming a macro cell 15 instead of connecting to the indoor base station 10. As previously has been discussed, this will lead to poor utilization of system resources. Specifically, this may cause unnecessary load on the macro cell 15. Typically, indoor users will typically be on "cell edge" of the macro cell 15 due to through-wall signal loss, and generally consume more spectrum resources than outdoor users in the same cell.

In the following, the mobile terminals will be referred to as User Equipment (UE) embodied in the form of for example smart phones, laptops, tablets, portable media players, etc. In LTE, the macro cell base station 14 is referred to as an eNodeB.

In LAA, the eNodeB 14 will form what is known as a primary serving cell 15 served by a primary carrier/channel via which e.g. the UE 13:1 will communicate. Management of signalling and control data, commonly referred to as Radio Resource Control (RRC), is only handled by the macro cell/primary cell 15. The primary cell 15, which ensures that the connection to the UE 13:1 is maintained, is always located on the licensed spectrum carrier. Further in LAA, a secondary carrier/channel will be set up between the UE 13:1 and the indoor BS 10, thereby forming a secondary serving cell 11 utilizing the unlicensed spectrum. The indoor BS 10 has access to both the licensed and the unlicensed spectrum. A secondary carrier may be added and removed as required, while the primary carrier established over the macro cell 15 is only changed at handover. If the UE 13:1 would move towards the indoor BS 10, a handover is likely to occur, and the mobile terminal 13:1 will subsequently access the indoor cell 11 as its primary cell, as is the case with UEs 13:4, 13:5, 13:6. It should be noted that in the LAA approach, set up of the secondary carrier with the indoor BS 10 for utilizing the unlicensed spectrum is performed without requiring users to login to e.g. a separate Wi-Fi network as they normally would.

Figure 2:
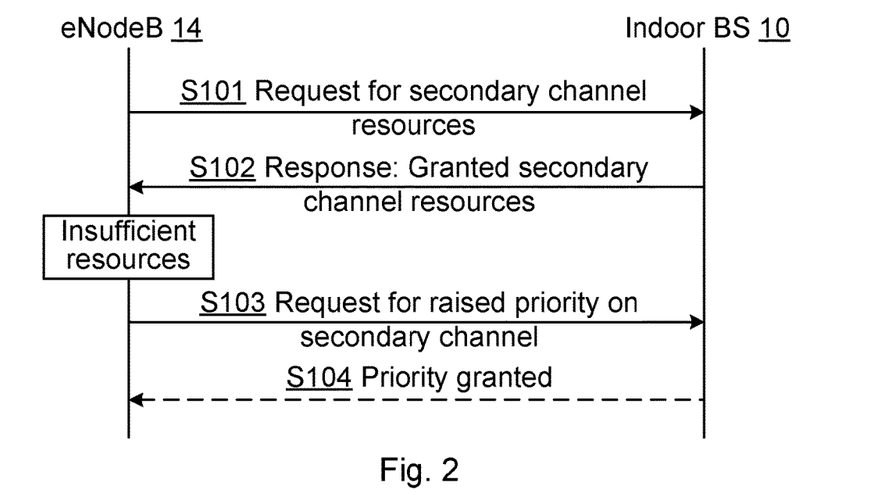
FIG. 2 shows a flowchart of a method according to an embodiment of the invention of requesting resources in the unlicensed spectrum for a mobile terminal.

Reference is now further made to FIG. 2 showing a flowchart for illustrating an embodiment of a method according to the invention performed by a first base station, i.e. the eNodeB 14, of requesting resources in the unlicensed spectrum for the UE 13:1 for which the eNodeB 14 serves as the primary cell base station.

In order to overcome the problem of unnecessarily loading the macrocell 15, the eNodeB 14 will in step S101 submit a request for the unlicensed spectrum resources to a second base station, i.e. the indoor BS 10, serving as a secondary cell base station for the UE 13:1, via what is commonly known in LTE as the X2 interface.

In step S102, the eNodeB 14 receives from the indoor BS 10 a response to the request indicating that unlicensed spectrum resources will be assigned by the indoor BS 10. Now, in case the eNodeB 14 for example considers the assigned unlicensed spectrum resources to be insufficient for serving the UE 13:1, the eNodeB 14 will submit a request to the indoor BS 10 in step S103 to give priority to assignment of the requested unlicensed spectrum resources for the UE 13:1 over resources requested by the other UEs 13:4, 13:5, 13:6 for which the indoor BS 10 serves as a primary cell base station.

With the embodiment illustrated in FIG. 2, by advantageously prioritizing macro cell traffic on the secondary carrier, thereby assigning unlicensed spectrum to the macro cell UEs 13:1, 13:2, 13:3, at the expense of reduced capacity for indoor users 13:4, 13:5, 13:6 for which the indoor BS 10 forms the primary cell, undesired macro cell load caused by the indoor UEs 13:1, 13:2, 13:3 can be reduced or even minimized.

FIG. 2 illustrates that in a further optional embodiment, the eNodeB 14 receives in step S104 a response from the indoor BS 10 indicating that the requested unlicensed spectrum resources will be prioritized for the UE 13:1.

Figure 3:
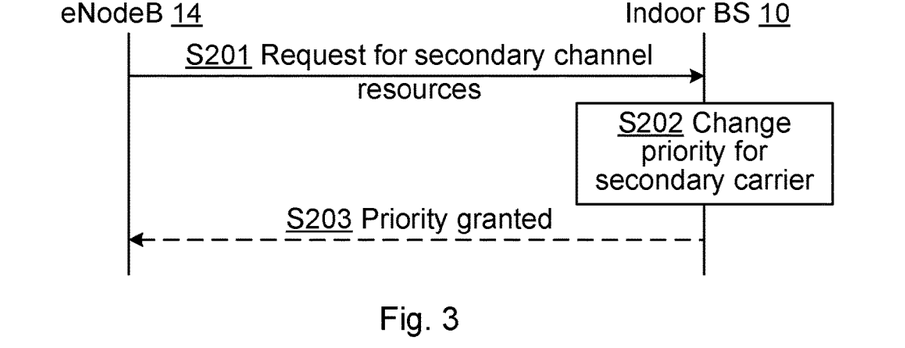
FIG. 3 shows a flowchart of a method according to an embodiment of the invention of assigning resources in the unlicensed spectrum for a mobile terminal.

FIG. 3 shows a flowchart for illustrating an embodiment of a method according to the invention performed by the second base station, i.e. the indoor BS 10, of assigning resources in the unlicensed spectrum for the UE 13:1 for which the indoor BS 10 serves a secondary cell base station.

In order to overcome the problem of unnecessarily loading the macrocell 15, the indoor BS 10 will in step S201 via the X2 interface receive a request for the unlicensed spectrum resources from the eNodeB 14 serving as the primary cell base station for the UE 13:1.

Upon receiving the request from the eNodeB 14, the indoor BS 10 will in step S202 prioritize assignment of unlicensed spectrum resources to the UE 13:1 over resources requested by the other UEs 13:4, 13:5, 13:6 for which the indoor BS 10 serves as the primary cell base station. Subsequently, the indoor BS 10 may reply to the eNodeB 14 whether the requested resources will be assigned or not.

Finally, in step S203, the indoor BS 10 may optionally submit a response to the eNodeB 14 indicating that the requested unlicensed spectrum resources will be prioritized for the UE 13:1. Hence, it may be envisaged that the indoor BS 10 responds to the eNodeB 14 whether requested resources are granted or not without explicitly responding whether priority will be given.

Again, by advantageously prioritizing macro cell traffic on the secondary carrier, thereby assigning unlicensed spectrum to the macro cell UEs 13:1, 13:2, 13:3, at the expense of reduced capacity for indoor users 13:4, 13:5, 13:6 for which the indoor BS 10 forms the primary cell, undesired macro cell load caused by the indoor UEs 13:1, 13:2, 13:3 can be reduced or even minimized.

Hence, in an embodiment, the prioritizing of the assignment of unlicensed spectrum resources in step S201 further comprises actively reducing the unlicensed spectrum resources assigned to one or more of the indoor UEs 13:4, 13:5, 13:6 for which the indoor BS 10 serves as a primary cell base station. Hence, should the macro cell UE 13:1 require e.g. a 100 MB resource for streaming a piece of data content at a given speed from the unlicensed spectrum, the UE 13:4 communicating with the indoor BS 10 may be assigned a resource which is decreased to same extent as the resource to the UE 13:1 is increased.

In an extreme case, the indoor BS 10 may determine that one or more of the UEs 13:4, 13:5, 13:6, is to be assigned no resource at all, at least temporarily, such that exclusivity can be given to one or more of the macro cell UEs 13:1, 13:2, 13:3. Hence, full priority will be given to the macro cell UEs 13:1, 13:2, 13:3 at the expense of the UEs 13:4, 13:5, 13:6 connecting to the indoor BS 10.

In yet a further embodiment, the UE 13:1 may perform a measurement to acquire information as to whether a base station 10 providing access to the unlicensed spectrum indeed is present in the building 12 (as it otherwise not would be possibly to apply LAA for offloading the eNodeB 14 forming the macro cell 15). Thus, the UE 13:1 performs an air interface measurement for finding out whether for instance a 5 GHz Wi-Fi is present in the building 12 and reports accordingly to the eNodeB 14. Alternatively, the UE 13:1 may perform a measurement to acquire information as to whether a base station 10 providing access to the licensed spectrum indeed is present in the building 12. If so, the UE 13:1 will assume that the base station 10 also has access to the unlicensed spectrum.

The measurement may be performed by identifying a service set identifier (SSID) which is a unique identifier attached to the header of packets sent over a wireless local-area network (WLAN) for differentiating one WLAN from another, or by identifying a Cell ID (CID) which is a unique number used to identify each base station.

The eNodeB 14 may alternatively request over the X2 interface whether the indoor BS 10 has access to unlicensed spectrum resources.

Figure 4:
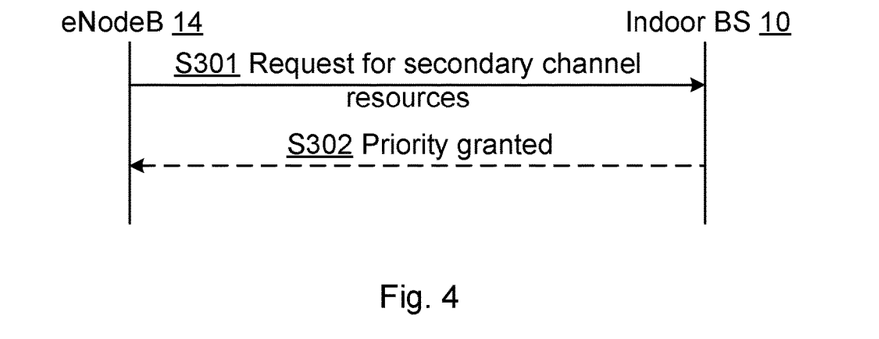
FIG. 4 shows a flowchart of a method according to an alternative embodiment of the invention of requesting resources in the unlicensed spectrum for a mobile terminal.

FIG. 4 shows a flowchart for illustrating a further embodiment of a method according to the invention performed by the eNodeB 14 of requesting resources in the unlicensed spectrum for the UE 13:1 for which the eNodeB 14 serves as the primary cell base station.

The eNodeB 14 will in step S301 submit a request for the unlicensed spectrum resources to the indoor BS 10 serving as a secondary cell base station for the UE 13:1 via the X2 interface. The request further comprises an indication to the indoor BS 10 to prioritize the requested unlicensed spectrum resources. The indoor BS 10 will thus give priority to the resources assigned to the UE 13:1 based on this request. Thereafter, in step S302, the eNodeB 14 may optionally receive a response from the indoor BS 10 indicating that the requested unlicensed spectrum resources will be prioritized for the UE 13:1.

In all embodiments illustrated throughout FIGS. 2-4, it can be envisaged that the request for unlicensed spectrum resources submitted from the eNodeB 14 to the indoor BS 10 comprises detailed information as to which resources are requested. That may subsequently facilitate the prioritization performed by the indoor BS 10.

Upon receiving the request, the indoor BS 10 will give priority to traffic carried by the secondary carrier. This may require the indoor BS 10 to assign fewer resources to indoor mobile terminals utilizing the indoor cell 11 as their primary cell.

Figure 5:
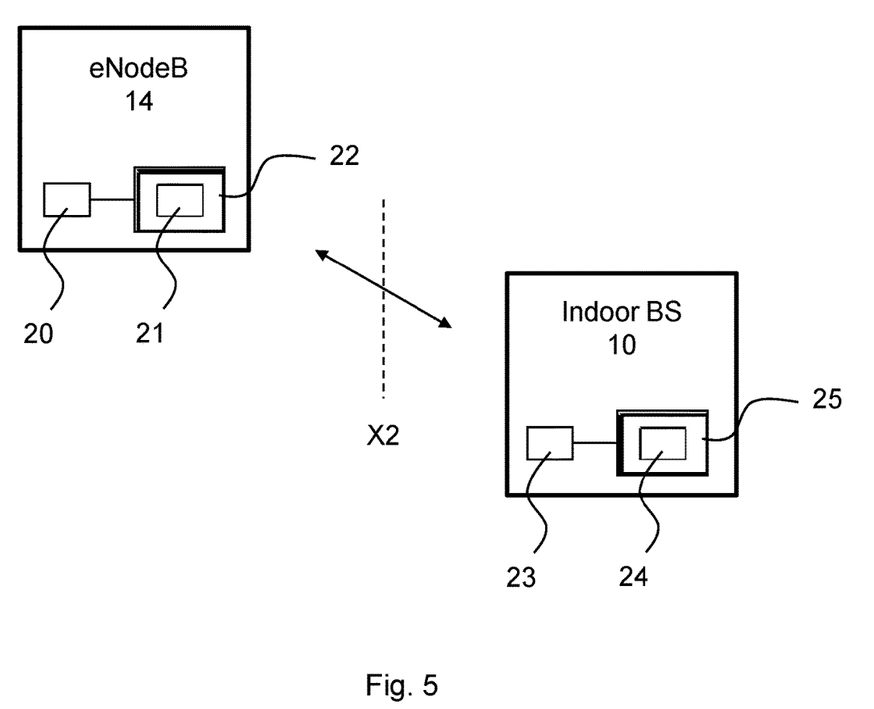
FIG. 5 illustrates a first base station and a second base station according to an embodiment of the invention.

With reference to FIG. 5, the steps of the method performed by the eNodeB 14 according to embodiments are in practice caused by a processing unit 20 embodied in the form of one or more microprocessors arranged to execute a computer program 21 downloaded to a suitable storage medium 22 associated with the microprocessor, such as a Random Access Memory (RAM), a Flash memory or a hard disk drive.

Similarly, the steps of the method performed by the indoor BS 10 according to embodiments are in practice caused by a processing unit 23 embodied in the form of one or more microprocessors arranged to execute a computer program 24 downloaded to a suitable storage medium 25 associated with the microprocessor, such as a Random Access Memory (RAM), a Flash memory or a hard disk drive.

The eNodeB 14 and the indoor BS 10 communicate over the X2 interface.

The processing units 20, 23 are arranged to cause the eNodeB 14 and the indoor BS 10, respectively, to carry out the steps of the respective method according to embodiments when the appropriate computer programs 21, 24 comprising computer-executable instructions are downloaded to the storage media 22, 25 and executed by the processing units 20, 23. The storage media 22, 25 may also be computer program products comprising the computer programs 21, 24.

Alternatively, the computer programs 21, 24 may be transferred to the storage media 22, 25 by means of a suitable computer program product, such as a Digital Versatile Disc (DVD) or a memory stick. As a further alternative, the computer programs 21, 24 may be downloaded to the storage media 22, 25 over a network. The respective processing unit 20, 23 may alternatively be embodied in the form of a digital signal processor (DSP), an application specific integrated circuit (ASIC), a field-programmable gate array (FPGA), a complex programmable logic device (CPLD), etc.

Figure 6A:
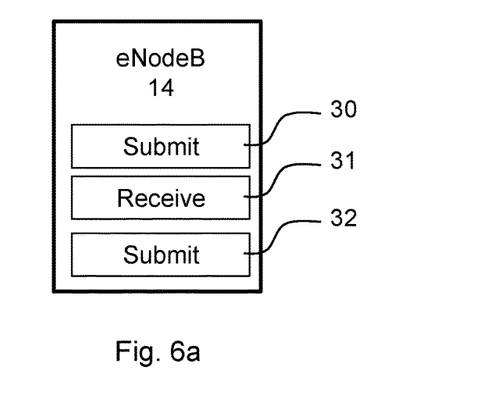
FIGS. 6a and b illustrate a first base station according to embodiments of the invention.

FIG. 6a illustrates the first base station, exemplified by an eNodeB 14, 3o according to an embodiment configured to request resources in an unlicensed spectrum for a mobile terminal for which the eNodeB 14 serves a primary cell base station. The eNodeB 14 comprises submitting means 30 adapted to submit a request for the unlicensed spectrum resources to a second base station (exemplified throughout the description by the indoor BS 10) serving as a secondary cell base station for the mobile terminal, and receiving means 31 adapted to receive a response to the request from the second base station indicating that unlicensed spectrum resources will be assigned. Further, the eNodeB 14 comprises submitting means 32 adapted to, in case the assigned unlicensed spectrum resources are not sufficient for serving the mobile terminal, submit a request to the second base station to give priority to assignment of the requested unlicensed spectrum resources over resources requested by mobile terminals for which the second base station serves as a primary cell base station.

The means 30, 31 and 32 may comprise a communications interface for receiving and providing information, and further a local storage for storing data, and may (in analogy with the description given in connection to FIG. 5) be implemented by a processor embodied in the form of one or more microprocessors arranged to execute a computer program downloaded to a suitable storage medium associated with the microprocessor, such as a RAM, a Flash memory or a hard disk drive.

Figure 6B:
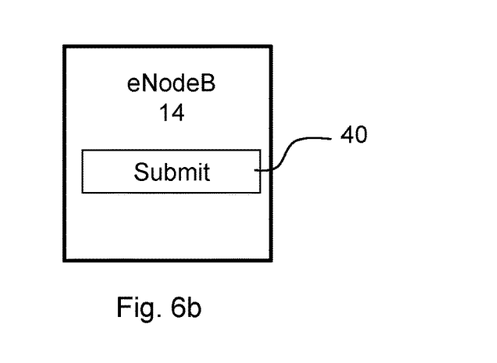

FIG. 6b illustrates the first base station, exemplified by an eNodeB 14, according to another embodiment configured to request resources in an unlicensed spectrum for a mobile terminal for which the eNodeB 14 serves a primary cell base station The eNodeB 14 comprises submitting means 40 adapted to submit a request for the unlicensed spectrum resources to a second base station (exemplified throughout the description by the indoor BS 10) serving as a secondary cell base station for the mobile terminal, the request further comprising an indication to the second base station to prioritize the requested unlicensed spectrum resources.

The means 40 may comprise a communications interface for receiving and providing information, and further a local storage for storing data, and may (in analogy with the description given in connection to FIG. 5) be implemented by a processor embodied in the form of one or more microprocessors arranged to execute a computer program downloaded to a suitable storage medium associated with the microprocessor, such as a RAM, a Flash memory or a hard disk drive.

Figure 7:
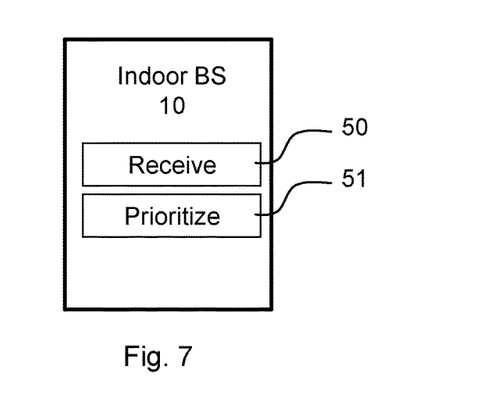
FIG. 7 illustrates a second base station according to an embodiment of the invention.

FIG. 7 illustrates the second base station, exemplified by an indoor BS 10, according to an embodiment configured to assigning resources in an unlicensed spectrum for a mobile terminal for which the indoor BS 10 serves a secondary cell base station. The indoor BS 10 comprises receiving means 50 adapted to receive a request for the unlicensed spectrum resources from a first base station (exemplified throughout the description by the eNodeB 14) serving as a primary cell base station for the mobile terminal, and prioritizing means 51 adapted to prioritize assignment of unlicensed spectrum resources to the mobile terminal over resources requested by mobile terminals for which the indoor BS 10 serves as a primary cell base station.

The means 50 and 51 may comprise a communications interface for receiving and providing information, and further a local storage for storing data, and may (in analogy with the description given in connection to FIG. 5) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of assigning resources in an unlicensed spectrum for a mobile terminal for which a second base station serves as a secondary cell base station, the method comprising the second base station:

receiving a request for the unlicensed spectrum resources from a first base station serving as a primary cell base station for the mobile terminal; and     prioritizing assignment of unlicensed spectrum resources to the mobile terminal over resources requested by other mobile terminals for which the second base station serves as a primary cell base station by reducing the unlicensed spectrum resources assigned to one or more of the other mobile terminals.

2. The method of claim 1, further comprising the second base station submitting a response to the first base station indicating that the requested unlicensed spectrum resources will be prioritized for the mobile terminal.

3. The method of claim 1, further comprising the second base station submitting a response to the first base station indicating that the requested unlicensed spectrum resources will be assigned to the mobile terminal.

4. A base station configured to assign resources in an unlicensed spectrum for a mobile terminal for which the base station serves as a secondary cell base station, the base station comprising:

processing circuitry; and memory containing instructions executable by the processing circuitry whereby the base station is operative to:

receive a request for the unlicensed spectrum resources from another base station serving as a primary cell base station for the mobile terminal; and         prioritize assignment of unlicensed spectrum resources to the mobile terminal over resources requested by other mobile terminals for which the base station serves as a primary cell base station by reducing the unlicensed spectrum resources assigned to one or more of the other mobile terminals.

5. The base station of claim 4, wherein the instructions are such that the base station is operative to submit a response to another base station indicating that the requested unlicensed spectrum resources will be prioritized for the mobile terminal.

6. A non-transitory computer readable recording medium storing a computer program product for assigning resources in an unlicensed spectrum for a mobile terminal for which a second base station serves as a secondary cell base station, the computer program product comprising software instructions which, when run on processing circuitry of the second base station, causes the second base station to:

receive a request for the unlicensed spectrum resources from a first base station serving as a primary cell base station for the mobile terminal; and     prioritize assignment of unlicensed spectrum resources to the mobile terminal over resources requested by other mobile terminals for which the second base station serves as a primary cell base station by reducing the unlicensed spectrum resources assigned to one or more of the other mobile terminals.

7. The non-transitory computer readable recording medium of claim 6, wherein the instructions are such that they, when run on the processing circuitry of the second base station, cause the second base station to submit a response to the first base station indicating that the requested unlicensed spectrum resources will be prioritized for the mobile terminal.

8. The non-transitory computer readable recording medium of claim 6, wherein the instructions are such that they, when run on the processing circuitry of the second base station, cause the second base station to submit a response to the first base station indicating that the requested unlicensed spectrum resources will be assigned to the mobile terminal.

\* \* \* \* \*